USO10288155B2

(12) United States Patent
Märkl et al.

(10) Patent No.: US 10,288,155 B2
(45) Date of Patent: May 14, 2019

(54) DUAL CLUTCH TRANSMISSION

(71) Applicant: AUDI AG, Ingolstadt (DE)

(72) Inventors: Johann Märkl, Neuburg an der Donau (DE); Axel Heitmann, Ditzingen (DE); Steffen Hummel, Ingolstadt (DE); Frank Vollmer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 759 days.

(21) Appl. No.: 14/439,433

(22) PCT Filed: Oct. 23, 2013

(86) PCT No.: PCT/EP2013/003184
§ 371 (c)(1),
(2) Date: Apr. 29, 2015

(87) PCT Pub. No.: WO2014/067632
PCT Pub. Date: May 8, 2014

(65) Prior Publication Data
US 2015/0300470 A1 Oct. 22, 2015

(30) Foreign Application Priority Data

Oct. 30, 2012 (DE) .................. 10 2012 021 599

(51) Int. Cl.
B60K 17/346 (2006.01)
F16H 3/00 (2006.01)
F16H 37/04 (2006.01)
(52) U.S. Cl.
CPC ....... *F16H 37/046* (2013.01); *B60K 17/3467* (2013.01); *F16H 3/006* (2013.01);
(Continued)

(58) Field of Classification Search
CPC ... B60K 17/3467; F16H 3/006; F16H 37/046; F16H 2200/0017; F16H 2200/006;
(Continued)

(56) References Cited

U.S. PATENT DOCUMENTS 6,893,373 B2 * 5/2005 Kawamoto ............. F16H 3/666
475/302
7,914,412 B2 3/2011 Gitt
(Continued)

FOREIGN PATENT DOCUMENTS

CN 101358634 2/2009
CN 101504060 8/2009
(Continued)

OTHER PUBLICATIONS

International Search Report issued by the European Patent Office in International Application PCT/EP2013/003184.
(Continued)

*Primary Examiner* — Tisha D Lewis
(74) *Attorney, Agent, or Firm* — Henry M. Feiereisen LLC

(57) ABSTRACT

A dual clutch transmission as a speed-change transmission for motor vehicles, includes two coaxially arranged input shafts, each being activatable via a clutch, an output shaft and gearwheel sets that are mounted on the shafts and can be shifted by means of shifting clutches to allow a plurality of forward gears and a reverse gear, the gearwheel sets being subdivided into a sub-transmission having the one input shaft and a sub-transmission having the other input shaft. To achieve a wider gear-ratio spread in a structurally compact construction, a shifting unit that can be shifted between two gear ratio stages is mounted upstream of the sub-transmission having the hollow input shaft.

14 Claims, 6 Drawing Sheets

(52) U.S. Cl.
CPC ............... *F16H 2200/006* (2013.01); *F16H 2200/0017* (2013.01); *F16H 2200/0065* (2013.01); *F16H 2200/0073* (2013.01); *F16H 2200/0086* (2013.01); *F16H 2200/2005* (2013.01); *F16H 2200/2035* (2013.01)

(58) Field of Classification Search
CPC ..... F16H 2200/0086; F16H 2200/2005; F16H 2200/2035
See application file for complete search history.

(56) References Cited

U.S. PATENT DOCUMENTS

| | | | |
|---|---|---|---|
| 8,043,187 B2 | 10/2011 | Yang | |
| 8,561,493 B2 | 10/2013 | Hoffmann | |
| 8,627,736 B2 | 1/2014 | Märkl | |
| 8,746,096 B2 | 6/2014 | Märkl | |
| 9,533,562 B2* | 1/2017 | Markl | B60K 6/365 |
| 2005/0205378 A1 | 9/2005 | Miyazaki et al. | |
| 2009/0156349 A1* | 6/2009 | Yang | F16H 37/046 |
| | | | 475/218 |
| 2010/0016115 A1 | 1/2010 | Braford, Jr. | |
| 2011/0230298 A1* | 9/2011 | Salamandra | F16H 37/046 |
| | | | 475/207 |
| 2013/0123057 A1 | 5/2013 | Märkl | |
| 2013/0123058 A1 | 5/2013 | Märkl | |
| 2013/0337972 A1* | 12/2013 | Lee | B60W 20/40 |
| | | | 477/5 |

FOREIGN PATENT DOCUMENTS

| | | |
|---|---|---|
| CN | 102720809 | 10/2012 |
| DE | 35 46 454 | 2/1987 |
| DE | 102 30 185 | 1/2004 |
| DE | 603 02 573 | 7/2006 |
| DE | 10 2006 015 661 | 10/2007 |
| DE | 10 2006 025 053 | 11/2007 |
| DE | 10 2008 030 376 | 6/2009 |
| DE | 10 2008 001 200 | 10/2009 |
| DE | 10 2008 054 477 | 6/2010 |
| EP | 0 797 025 | 9/1997 |
| EP | 2 141 385 | 1/2010 |
| JP | 2002-364718 | 12/2002 |
| WO | WO 2011/128148 | 10/2011 |

OTHER PUBLICATIONS

Chinese Search Report dated Sep. 27, 2016 with respect to counterpart Chinese patent application 201380056725.6.
Translation of Chinese Search Report dated Sep. 27, 2016 with respect to counterpart Chinese patent application 201380056725.6.

* cited by examiner

Fig. 2

|  | 1 2 3 4 5 6 7 8 | R1 R2 |
|---|---|---|
| B/K1/K3 (TG-A)<br>K2 (TG-B) | IP—I     IIIP—III     VP—V<br>         II            IV | RP—R |

Fig. 3

|  | 1 2 3 4 5 6 7 8 | R |
|---|---|---|
| B/K1/K3 (TG-A)<br>K2 (TG-B) | IP—I     IIIP—III     VP—V<br>         II            IV | R |

Fig. 4

|  | 1 2 3 4 5 6 7 8 9 10 11 | R1 R2 |
|---|---|---|
| B/K1/K2 (TG-A)<br>K2 (TG-B) | IP—I⟍ ⟋IIIP—III⟍ ⟋VP—V⟍ ⟋VIIP—VII<br>II IV VI | RP - R |

Fig. 5

|  | 1 2 3 4 5 6 7 8 9 10 11 | R |
|---|---|---|
| B/K1/K2 (TG-A)<br>K2 (TG-B) | IP—I⟍ ⟋IIIP—III⟍ ⟋VP—V⟍ ⟋VIIP—VII<br>II IV VI | R<br>R |

Fig. 6

|            | 1 2 3 4 5 6 7 8 9 | R1  R2 |
|------------|-------------------|--------|
| B/K1/K2 (TG-A) | ⁄IIP—II⧵   IVP—IV⧵   ⁄VIP—VI⎮ | RP— R2 |
| K2 (TG-B)  | I      III⁄     V         |        |

Fig. 7

|            | 1 2 3 4 5 6 7 8 9 | R |
|------------|-------------------|---|
| B/K1/K2 (TG-A) | ⁄IIP—II⧵   IVP—IV⧵   ⁄VIP—VI⎮ |   |
| K2 (TG-B)  | I      III⁄     V         | R |

DUAL CLUTCH TRANSMISSION

CROSS-REFERENCES TO RELATED APPLICATIONS

This application is the U.S. National Stage of International Application No. PCT/EP2013/003184, filed Oct. 23, 2013, which designated the United States and has been published as International Publication No. WO 2014/067632 and which claims the priority of German Patent Application, Serial No. 10 2012 021 599.1, filed Oct. 30, 2012, pursuant to 35 U.S.C. 119(a)-(d).

BACKGROUND OF THE INVENTION

The present invention relates to a shifting device for a dual clutch transmission as change speed transmission for motor vehicles.

Such dual clutch transmissions can be used as automated shift transmissions with good transmission efficiency, and due to the division into two subtransmissions and two separating clutches can be switched fast and without interruption of traction. In order to optimally adjust such change-speed transmissions to the drive power of the drive aggregate or internal combustion engines, a great transmission spacing is desired, which can be realized for example by providing a higher number of forward gears (in the absence of excessive transmission steps).

SUMMARY OF THE INVENTION

It is an object of the present invention to set forth a dual clutch transmission of the generic type which enables a great transmission spacing and in particular an increased number of forward gears, while at the same time being of compact construction and well manageable in terms of control.

The object is solved with the features of the independent patent claim. Advantageous embodiments and refinements of the invention are set forth in the dependent claims.

According to the invention it is proposed that a planetary transmission which can be switched in two transmission ratios, is arranged upstream of the subtransmission A with an input hollow shaft. The planetary transmission results in a doubling of the number of gears in the subtransmission A, whereby in the subtransmission B in spite of the realizable greater transmission spacing the number of the gear sets can be reduced relative to a conventional gear set so that the overall length of the transmission is not increased and the additional costs can be kept low. The forward gears realized in the subtransmission A can be driven in two different transmission ratios per gear set, wherein the switching can also be accomplished relatively easily and automated. The forward gears in the subtransmission B are assigned so that the traction free (interruption free) switching of the gears is retained.

As an alternative to the planetary transmission mentioned above, generally any other shifting unit arranged upstream or downstream of the subtransmission A that can be switched between two transmission ratios is included by the invention. In the following, however, the specific configuration of the shifting unit as an upstream arranged planetary transmission is used to illustrate the functioning of the invention.

As is known, the planetary transmission has an input element, an output element and a transmission element, which can be fixed via a brake, for switching the lower or higher transmission ratio. A separate clutch enables switching into a higher transmission ratio 1:1, wherein the clutch connects two elements of the planetary transmission with each other so that no transmission losses occur in the 1:1 transmission ratio. The brake and the clutch are preferably hydraulically actuatable friction based elements, for example of a multi-disc construction.

In an advantageous embodiment of the invention, the input element of the planetary transmission can be a ring gear and the output element a web which carries planet gears, while the transmission element is a sun gear which meshes with the planet gears, and which can be fixed via a brake or can be connected via the separate clutch with one of the other elements of the planetary transmission. Hereby the starting process retains in a manner known per se the clutch K1, while the sun gear is supported or locked via the brake for transmitting the drive torque.

The separate cutch, for example a multi-disc clutch, can constructively advantageously be provided between the driving ring gear and the sun gear; further the brake and the separate clutch can be arranged on a common hollow shaft together with the sun gear.

In a further advantageous embodiment of the invention, the planetary transmission can be configured as minus transmission (standard transmission ratio for example $i_0=-3$), whereby in particular in the speed reduction ratio the proportion of the clutch power or the transmission efficiency is further improved.

In a further preferred configuration of the invention, the change-speed transmission can have at least eight forward gears, of which the first and second forward gear, the fourth and fifth forward gear and the seventh and eight forward gears are assigned to the subtransmission A with the upstream arranged planetary transmission, and the third and sixth forward gears are assigned to the subtransmission B. The eight forward gears can thus be realized by only five instead of eight gear sets, wherein the number of the forward gears of the three gear sets of the subtransmission A are doubled via the shiftable planetary transmission.

In an alternative shifting sequence, the second and third forward gears (2/3) the fifth and sixth forward gears (5/6) and the eight and ninth forward gears (8/9) can be assigned to the subtransmission A with the upstream or downstream arranged shifting unit (60). The first, fourth and seventh forward gear (1/4/7) can on the other hand be assigned to the subtransmission B. This renders the transmission step 1/2 is independent of the splitter unit.

In a change-speed transmission with more than eight forward gears the ninth forward gear can be assigned to the subtransmission B via a further gear set and optionally the forward gears 10 and 11 can be assigned to the subtransmission A also via a further gear set.

Finally, a gear set with an intermediate gearwheel can be assigned to the subtransmission A with the upstream arranged planetary gear transmission for providing two reverse gears; as an alternative the gear set with intermediate gearwheel can be arranged in the subtransmission B for forming only one reverse gear. The latter has the advantage that the starting gears (forward-reverse) are not controlled via the same starting element and with this an uneven clutch wear can be avoided.

BRIEF DESCRIPTION OF THE DRAWING

In the following, multiple exemplary embodiments of the invention are explained in more detail by way of the included schematic drawings. It is shown in:

FIGS. 2 and 3 respectively a shifting matrix with illustration of the shifting sequences for a dual clutch transmission with eight forward gears;

FIGS. 4 and 5 respectively in a view according to FIG. 2 a shifting matrix of a dual clutch transmission with eleven forward gears;

FIGS. 6 and 7 respectively an alternative shifting matrix of a dual clutch transmission with nine forward gears;

DETAILED DESCRIPTION OF PREFERRED EMBODIMENTS

Figure 1:
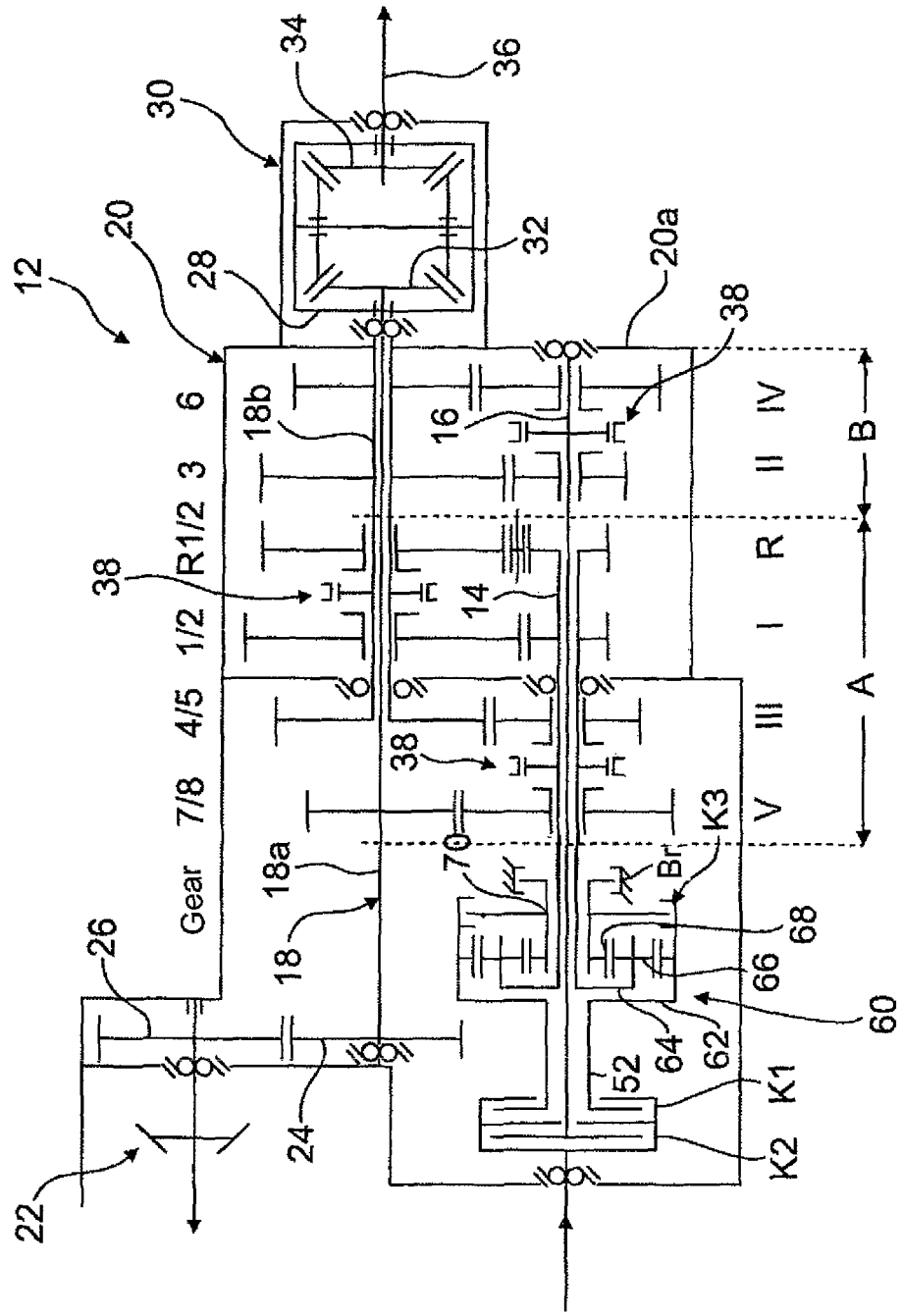
FIG. 1 a block diagram of a dual clutch transmission for an all wheel drive motor vehicle, with two subtransmissions A and B, wherein a planetary transmission is arranged upstream of the subtransmission A.

FIG. 1 shows very schematically a dual clutch transmission 12 as change-speed transmission for motor vehicles, with two co-axial transmission input shafts 14, 16, which can be drivingly connected to a drive aggregate or an internal combustion engine (not shown) via two separating clutches K1, K2. The input shaft 14 is configured as hollow shaft.

Axially parallel to the input shafts 14, 16 an output shaft 18 is provided, which in the exemplary embodiment is formed by a first output shaft 18a and a second coaxial output shaft 18b, which is configured as hollow shaft.

Via spur gears 24, 26 the first output shaft 18a outputs onto a front axle differential (only indicated schematically), which is mounted on the transmission housing 20, while the second output shaft 18b outputs onto the differential housing 28 of an interaxle differential 30, whose output element or bevel-gears 32, 34 are connected on one end with the output shaft 18a for driving the front axle differential 22 and on the other end with an output shaft 36 for driving a rear axle differential (not shown) of the motor vehicle.

The shown configuration of the output shaft 18 with the interaxle differential 30 makes it possible that individual forward gears directly output onto the front axle differential, while other forward gears and the reverse gear represent an all-wheel drive via the interaxle differential 30.

When outputting only onto an axle differential 22 (front wheel drive) or via the output shaft 36 onto a rear axle differential (rear wheel drive), the output shaft 18 also be configured one-piece and without interaxle differential 30.

The mentioned shafts 14, 16, 18 etc. are rotatably supported in the transmission housing 20 via only schematically indicated rolling bearings.

The dual clutch transmission 12 is divided into a subtransmission A and a subtransmission B, wherein the input hollow shaft 14 only extends within the subtransmission A, while the input shaft 16 is guided through the input shaft 14 into the subtransmission B up to the end wall 20a of the transmission housing.

In the subtransmission A three forward-gears gear sets I, II, V and a reverse-gear gear set R with an integrated reverse gearwheel are arranged, which are composed in a known manner of fixed gears and idler gears, wherein. the idler gears can be shifted via synchronous clutches (generally designated 38). The gear sets I, II, V, R form the forward gears 1/2, 4/5, 7/8 and two reverse gears R 1/2 (as will be explained below).

In the subtransmission B two forward-gear gear sets II and IV are provided, which are also formed by fixed gears and idler gears which can be shifted via a synchronous clutch 38, and which in the corresponding transmission configuration form the forward gears 3 and 6.

A planetary transmission 60 is arranged upstream of the subtransmission A adjacent the dual clutch K1, K2, which planetary transmission 60 is configured coaxial to the output hollow shaft 14 and which can be switched between two transmission ratios or between a lower/higher transmission ratio and a 1:1 transmission ratio.

The planetary transmission 60 which is attached to the dual clutch K1, K2, has a ring gear 62 as input element, which is drivingly connected to the clutch K1 via the ring gear 52, a web 64 with rotatably supported planet gears 66 as output element, and a sun gear 68 as transmission element.

The web 64 is directly drivingly connected with the input hollow shaft 14 of the subtransmission A, while the sun gear 68 is connected to the housing-fixed brake Br via a further hollow shaft 70.

In addition a separate multi-disc clutch K3 is provided between the ring gear 62 and the hollow shaft 70 or the sun gear 68, which multi-disc clutch when hydraulically impinged connects the the ring gear 62 with the sun gear 68 and thus forms the 1:1 transmission ratio of the planetary transmission 60. The clutch K1 then drives the hollow shaft 14 of the subtransmission A via the blocked planetary transmission 60.

The lower transmission ratio is shifted in the planetary transmission when the clutch K1 is engaged, the clutch K3 is disengaged and the brake Br is actuated. In this case the engaged clutch K1 drives the input shaft 14 via the ring gear 62, the planetary gears 66 and the web 64, while the sun gear 68 is blocked as support element. When the brake Br is released the drive power is interrupted.

For switching the planetary transmission 60 into the 1:1 transmission ratio, the clutch K1 remains engaged, while the brake Br is released and at the same time the clutch K3 is engaged. As a result the ring gear 62 (input element) and the sun gear 68 (transmission element) are connected and the planetary transmission 60 is blocked. In the 1:1 transmission ratio of the planetary transmission 60 according to FIG. 2 the forward gears 2, 5, 8 and the reverse gear can be switched.

In FIG. 1 the starting of the motor vehicle is controlled via the clutch K1 after the engagement of the brake Br. The brake Br can correspondingly be constructed simple and can thus have small dimensions because in this case only the support torque has to be transmitted for blocking the sun gear 68.

For shifting the forward gears 3 and 6 of the subtransmission B, the gear sets II or IV are shifted in a manner known per se via the synchronous clutch 38 and are activated via the separating clutch K2. Hereby the clutch K1, the clutch K3 and the brake Br of the planetary transmission 60 are disengaged.

The shifting matrix according to FIG. 2 shows the shifting sequences for example when passing through the forward gears 1 to 8 and the two possible reverse gears R1 and R2.

When the motor vehicle is started in the 1. gear the drive moment is introduced after the coupling of the gear set I by means of the synchronous clutch 38 via the brake Br, wherein the planetary transmission 60 as described before is in the lower transmission ratio which leads to higher output torques (this is respectively indicated for example with IP; P stands respectively for planetary transmission 60 active).

Subsequently, the 2. gear is switched in that the brake Br is disengaged and the clutch K3 is engaged. This can be controlled without any interruption of traction. In the switching processes described so far, the 3. gear can be already engaged beforehand in the subtransmission B via the synchronous clutch 38.

When switching into the 3. Gear, the clutch K1 is disengaged and without interruption of the traction the clutch K2 is simultaneously closed.

When driving in the 3. Gear, the gear set III in the subtransmission A for the 4. and 5. gear can be switched via the synchronous clutch 38. The activation of the gears 4 and 5 then occurs analogously to the gears 1 and 2 described above via the brake Br (IIIP) and subsequently via the clutch K3 (III).

The same applies to the 6th gear in the subtransmission B and the further gears 7 and 8 in the subtransmsission A.

For switching the reverse gears via the reverse-gear gear set R, the gear set R is switched in the stationary motor vehicle via the synchronous clutch 38 and then either the brake is actuated (R1 or RP) or when the brake Br is disengaged the clutch K3 is closed (R2 or R).

Figure 8:
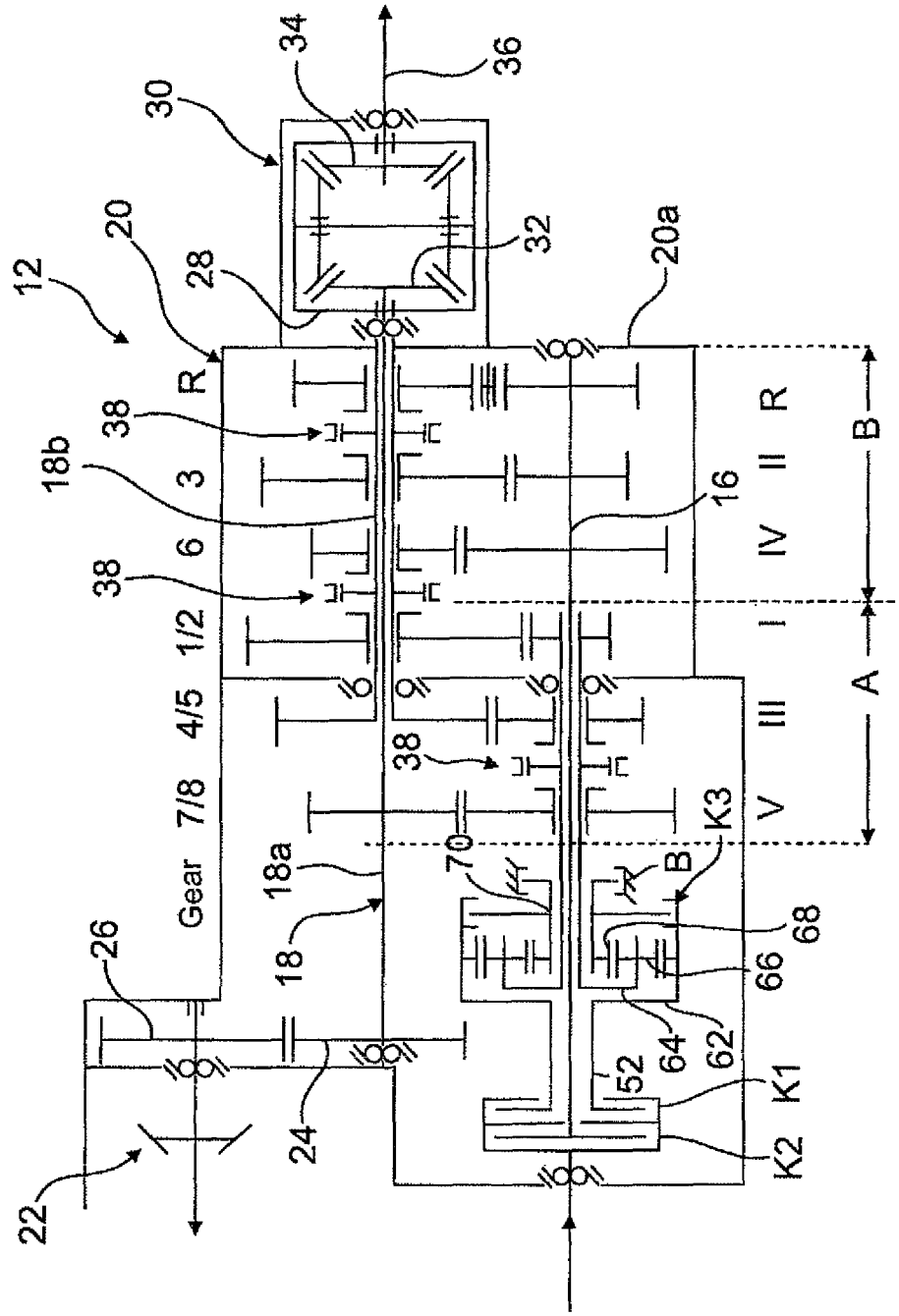
FIG. 8 in a view corresponding to FIG. 1 a further exemplary embodiment of a dual clutch transmission with eight forward gears and a reverse gear with only three switching groups.

FIG. 3 shows a further shifting matrix whose shifting sequence when passing through the forward gears 1 to 8 is identical to the matrix shown in FIG. 2. In contrast to FIG. 2 the shifting matrix of FIG. 3 relates to a dual clutch transmission in which the reverse-gear gear wheel set R is not (as in FIG. 1) arranged in the subtransmission A but in the subtransmission B. Correspondingly, according to the shifting matrix of FIG. 3, not two but only one reverse gear R is switchable. The shifting matrix shown in FIG. 3 can be realized by a dual clutch transmission as it is shown in FIG. 8 and described below.

Figure 9:
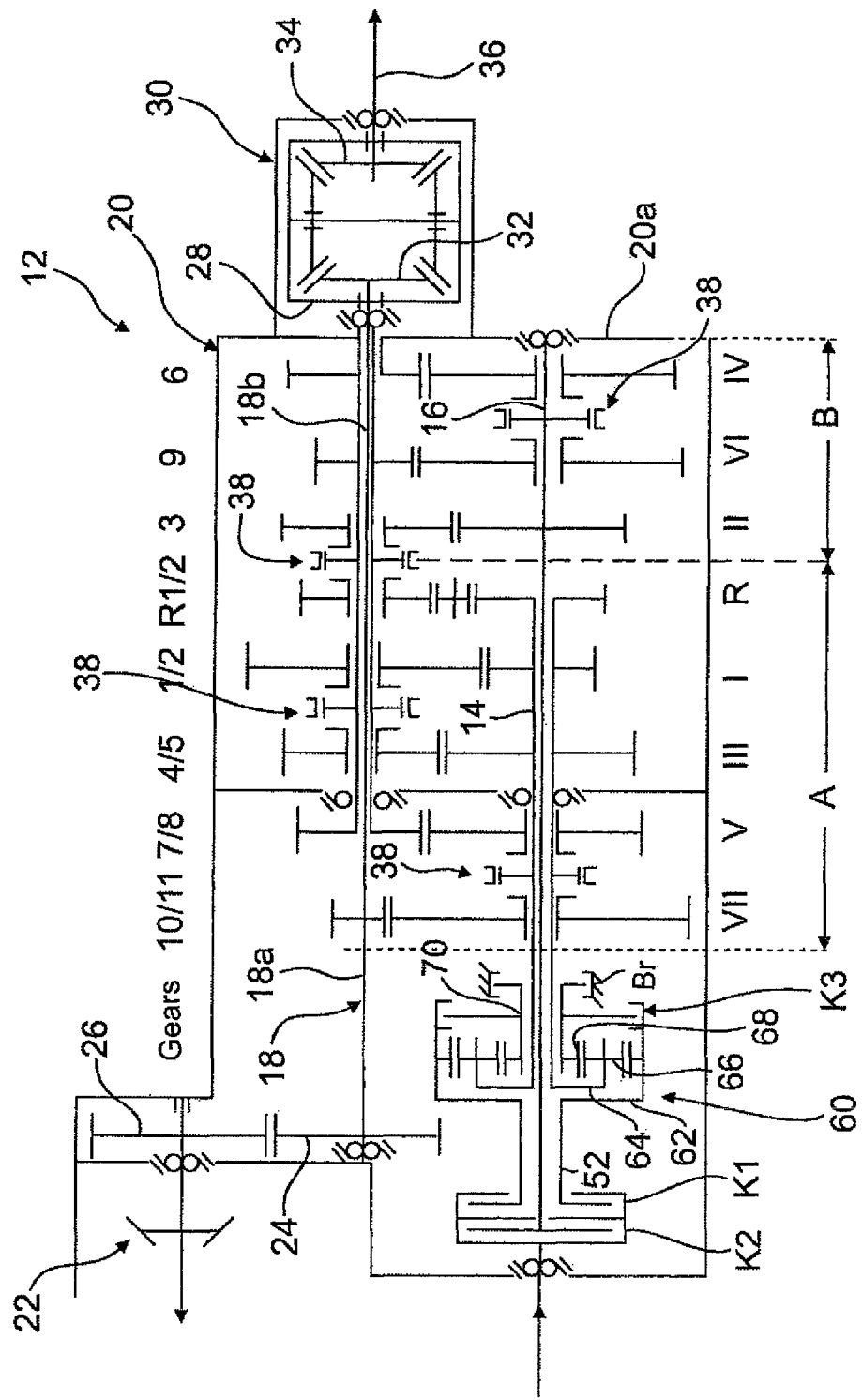
FIG. 9 in a view according to FIG. 1 a further exemplary embodiment of a dual clutch transmission with eleven forward gears and two reverse gears.

FIG. 4 shows a further shifting matrix whose shifting sequence up to the 8th gear is identical to the shifting sequence shown in FIG. 2. The shifting matrix in FIG. 4 has further forward gears 9 to 11, which can be switched according to the switching pattern described above. The shifting matrix shown in FIG. 4 can be realized in a dual clutch transmission as it is shown in FIG. 9. In contrast to FIG. 1 an additional gear set VII is provided in the subtransmission A, beside the gear sets I, Ill, V and R. This additional gear set VII forms in the corresponding transmission ratio configuration the gears 10 and 11. In addition a gear set VI for the 9th gear is provided in the subtransmission B shown in FIG. 9 beside the gear sets II and IV (for the 3rd and 6th gear).

In the arrangement shown in FIG. 9 overall four shifting groups, i.e., synchronous clutches 38 are installed. Of these a synchronous clutch 38 is provided which is shiftable between the reverse-gear gear set R1/2 assigned to the subtransmission A and the gear set II (for the 3rd gear) assigned to the subtransmission B.

FIG. 5 shows a further shifting matrix whose shifting sequence when passing through the forward gears 1 to 11 is identical to the shifting sequence shown in FIG. 4. In contrast to FIG. 4, however, the shifting matrix show in FIG. 5 has a dual clutch transmission in which the reverse-gear gear set is not arranged in the subtransmission A but in the subtransmission B. correspondingly only a single reverse gear R is switchable in the shifting matrix shown in FIG. 5.

FIG. 6 illustrates an alternative shifting matrix. According to this, in the change-speed transmission 12, the first, fourth and seventh forward gears 1/4/7 are assigned to the subtransmission B. The second and third forward gears 2/3, the fifth and sixth forward gears 5/6 and the eight and ninth forward gears 8/9 are assigned to the subtransmission A with the upstream arranged planetary transmission.

In this case when the motor vehicle starts driving in the 1. gear, the clutch K1 which drives the subtransmission A is engaged and the clutch K2 which drives the subtransmission Br is engaged. In the subtransmission A, the 2. gear can already be engaged beforehand. Subsequently the 2. gear can be switched in that the clutch K2 is disengaged and without interrupting traction the clutch K1 is engaged, namely when the brake Br is actuated and clutch K3 is disengaged. Subsequently the third gear can be switched in that the brake B is disengaged and at the same time the clutch K3 is engaged.

When switching into the 4th gear, the clutch K1 is disengaged once again and without interruption of traction the clutch K2 is simultaneously engaged. The further gears can be switched in a corresponding manner.

FIG. 7 shows a further shifting matrix whose shifting sequence when passing through the forward gears 1 to 9 is identical to that of the shifting sequence shown in FIG. 6. In contrast to FIG. 6 however the shifting matrix shown in FIG. 7 relates to a dual clutch transmission in which the reverse-gear gear set is not arranged in the subtransmission A but in the subtransmission B. Correspondingly in the shifting matrix shown in FIG. 7 only a single reverse gear is switchable.

The construction and function of the dual clutch transmission shown in FIG. 8 is mostly identical to that of the dual clutch transmission shown in FIG. 1. Insofar reference is made to the description of the dual clutch transmission shown in FIG. 1.

In contrast to FIG. 1, however, only the forward-gear gear sets I, III, V but not the reverse-gear gear set R is arranged in the subtransmission A. In FIG. 8 the reverse-gear gear set R is arranged in the subtransmission B together with the forward-gear gear sets II and IV. Correspondingly in the dual clutch transmission of FIG. 8—in contrast to FIG. 1—only a single reverse gear is provided.

The arrangement of the gear sets shown in FIG. 8 has the advantage that the first gear and the reverse gear R are provided in different subtransmissions A, B, i.e., on different clutches K1, K2.

In the arrangement shown in FIG. 8, overall only three shifting groups, i.e., synchronous clutches 38 are built in. Of these a synchronous clutch 38 is provided, which is switchable between the gear set I assigned to the subtransmission A, and the gear set IV (for the 6th gear) assigned to the subtransmission B.

The invention claimed is:
1. A dual clutch transmission constructed as change-speed transmission for motor vehicles, comprising:
  two coaxially arranged input shafts and an output shaft, said input shafts being activatable via a respective clutch;
  gear sets arranged on the input shafts and being shiftable by shifting clutches for forming forward gears and a reverse gear, said gear sets being divided into a first subtransmission having one of the input shafts and a second subtransmission having the other one of the input shaft;
  a shifting unit arranged upstream of one of the first and second subtransmissions and having a ring gear, an output element and a transmission element, said shifting unit being shiftable between a first transmission stage and a second transmission stage; and a brake constructed to fix the transmission element, thereby shifting the shifting unit to the first transmission stage, and a separate clutch between the transmission element and the ring gear, thereby shifting the shifting unit to the second transmission stage, wherein the shifting unit is shiftable into a 1:1 transmission ratio via the separate clutch.

2. The dual clutch transmission of claim 1, wherein the shifting unit is constructed as a planetary transmission.

3. The dual clutch transmission of claim 1, wherein shifting between the first transmission stage and the second transmission stage of the shifting unit enables shifting between two transmission ratios.

4. The dual clutch transmission of claim 3, wherein the shifting between the first transmission stage and the second transmission stage of the shifting unit is under load.

5. The dual clutch transmission of claim 1, wherein the output element is a web carrying planet gears, and the transmission element is a sun gear meshing with the planet gears, said sun gear being fixable via the brake or being connectable with one of the output element and the ring gear via the separate clutch.

6. The dual clutch transmission claim 5, wherein the separate clutch is provided between the ring gear and the sun gear.

7. The dual clutch transmission of claim 5, wherein the brake, the separate clutch and the sun gear are arranged on a common hollow shaft.

8. The dual clutch transmission of claim 1, comprising eight forward gears, of which first and second forward gears, fourth and fifth forward gears and seventh and eighth forward gears are assigned to the first subtransmission with the upstream arranged shifting unit, and third and sixth forward gears are assigned to the second subtransmission.

9. The dual clutch transmission of claims 1, comprising eight forward gears, of which second and third forward gears, fifth and sixth forward gears, and eighth and ninth forward gears are assigned to the first subtransmsision with the upstream arranged shifting unit, and first, fourth and seventh forward gears are assigned to the second subtransmission.

10. The dual clutch transmission of claim 1, further comprising further gear set in one of the first and second subtransmissions defining further gears of the dual clutch transmission.

11. The dual clutch transmission of claim 1, wherein one of the gear sets has an intermediate gear wheel and is assigned to the first subtransmission with the upstream arranged shifting unit for forming two reverse gears.

12. The dual clutch transmission of claim 1, wherein one of the gear sets has an intermediate gear wheel and is arranged in the second subtransmission so as to form a reverse gear.

13. The dual clutch transmission of claim 1, wherein the gear set of the first gear and the gear set of the reverse gear are arranged in different ones of the first and second subtransmissions.

14. The dual clutch transmission of claim 1, wherein one of the shifting clutches is shiftable between one of the gear sets assigned to the first subtransmission and another one of the gear sets assigned to the second.

* * * * *

UNITED STATES PATENT AND TRADEMARK OFFICE
CERTIFICATE OF CORRECTION

| | |
|---|---|
| PATENT NO. | : 10,288,155 B2 |
| APPLICATION NO. | : 14/439433 |
| DATED | : May 14, 2019 |
| INVENTOR(S) | : Märkl |

It is certified that error appears in the above-identified patent and that said Letters Patent is hereby corrected as shown below:

On the Title Page

Item [56], page 2 Line 5:
Correct the first inventor's last name to read --Märkl--.

In the Claims

Column 7, Claim 6, Line 23:
After "The dual clutch transmission" insert --of--.

Signed and Sealed this
Thirteenth Day of August, 2019

Andrei Iancu
*Director of the United States Patent and Trademark Office*